(12) United States Patent
Lee et al.

(10) Patent No.: US 10,425,926 B2
(45) Date of Patent: Sep. 24, 2019

(54) METHOD AND APPARATUS FOR REQUESTING ADDITIONAL SYSTEM INFORMATION

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 15/590,644

(22) Filed: May 9, 2017

(65) Prior Publication Data

US 2017/0332372 A1     Nov. 16, 2017

Related U.S. Application Data

(60) Provisional application No. 62/334,418, filed on May 10, 2016, provisional application No. 62/334,427, filed on May 10, 2016, provisional application No. 62/334,443, filed on May 10, 2016.

(51) Int. Cl.
*H04W 72/04*    (2009.01)
*H04W 72/08*    (2009.01)
*H04W 48/14*    (2009.01)
*H04W 36/00*    (2009.01)
*H04W 76/00*    (2018.01)

(52) U.S. Cl.
CPC ... *H04W 72/0413* (2013.01); *H04W 36/0079* (2018.08); *H04W 48/14* (2013.01); *H04W 72/042* (2013.01); *H04W 72/085* (2013.01); *H04W 72/087* (2013.01); *H04W 76/00* (2013.01)

(58) Field of Classification Search
CPC ............. H04W 72/0413; H04W 48/14; H04W 72/042; H04W 72/085; H04W 72/087; H04W 76/00
See application file for complete search history.

(56) References Cited

U.S. PATENT DOCUMENTS

| | | | |
|---|---|---|---|
| 2014/0003354 A1* | 1/2014 | Ekici | H04W 76/19 370/329 |
| 2017/0019945 A1* | 1/2017 | Chiba | H04W 76/028 |
| 2017/0202051 A1* | 7/2017 | Hwang | H04W 76/19 |
| 2018/0352590 A1* | 12/2018 | Sha | H04W 76/27 |

OTHER PUBLICATIONS

3GPP TS 36.331 V9.3.0, 3rd GPP; TSGRAN, E-UTRA; RRC, Protocol Specification (Release 9), Jun. 2010.

* cited by examiner

*Primary Examiner* — Eric Myers
(74) *Attorney, Agent, or Firm* — Dentons US LLP

(57) ABSTRACT

Provided are a method for a user equipment (UE) to request additional system information in a wireless communication system, and an apparatus supporting the same. The method may include: transmitting a first uplink message including a system information request to a radio access network (RAN); receiving a first downlink message including requested system information from the RAN in response to the system information request; transmitting a second uplink message including an additional system information request to the RAN; and receiving requested additional system information from the RAN in response to the additional system information request.

8 Claims, 17 Drawing Sheets

METHOD AND APPARATUS FOR REQUESTING ADDITIONAL SYSTEM INFORMATION

CROSS-REFERENCE TO RELATED APPLICATIONS

Pursuant to 35 U.S.C. § 119 (e), this application claims the benefit of U.S. Provisional Applications No. 62/334,418, filed on May 10, 2016, No. 62/334,427, filed on May 10, 2016 and No. 62/334,443, filed on May 10, 2016, the contents of which are all hereby incorporated by reference herein in their entirety.

BACKGROUND OF THE INVENTION

Field of the Invention

The present invention relates to a wireless communication system, and more particularly, to a method for a user equipment (UE) to request additional system information and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

To achieve a high data transmission rate, implementing a 5G communication system in an extremely high frequency (mmWave) band (for example, a 60 GHz band) is being considered. To relieve the path loss of signals and to increase the transmission distance of signals in an extremely high frequency band, beamforming, massive multiple-input and multiple-output (massive MIMO), full dimensional MIMO (FD-MIMO), array antenna, analog beamforming, and large-scale antenna techniques are under discussion for a 5G communication system.

Further, to improve the network of the system, technical development in an evolved small cell, an advanced small cell, a cloud radio access network (cloud RAN), an ultra-dense network, device-to-device (D2D) communication, wireless backhaul, a moving network, cooperative communication, coordinated multi-points (CoMP), and interference cancellation is progressing for the 5G communication system.

In addition, an advanced coding modulation (ACM) scheme including hybrid frequency shift keying (FSK) and quadrature amplitude modulation (FQAM) and sliding window superposition coding (SWSC) and an advanced access technique including filter bank multi carrier (FBMC), non-orthogonal multiple access (NOMA), and sparse code multiple access (SCMA) are being developed in the 5G system.

System information refers to essential information for communications between a user equipment (UE) and a base station (BS). In 3GPP LTE, system information is divided into a master information block (MIB) and a system information block (SIB). The MIB is the most essential information, and the SIB is subdivided into SIBs-x according to importance or period. The MIB is transmitted through a physical broadcast channel (PBCH) that is a physical channel, while the SIB is transmitted as common control information through a PDCCH.

SUMMARY OF THE INVENTION

The number of system information blocks (SIBs) is steadily increasing. As the use of radio resources is needed to broadcast SIBs, an increase in the number of SIBs inevitably leads to an increase in the quantity of radio resources needed to broadcast SIBs. In transmitting a constantly increasing number of SIBs to a user equipment (UE), it is necessary to propose a system information acquiring method using efficiently utilizing radio resources.

One embodiment provides a method for a UE to request additional system information in a wireless communication system. The method may include: transmitting a first uplink message including a system information request to a radio access network (RAN); receiving a first downlink message including requested system information from the RAN in response to the system information request; transmitting a second uplink message including an additional system information request to the RAN; and receiving requested additional system information from the RAN in response to the additional system information request. Transmission of the system information request may be initiated by a radio link failure (RLF). Transmission of the system information request may be initiated by a handover failure (HOF). Transmission of the system information request may be initiated by a service request for a mobile originating (MO) signaling, MO call or mobile terminating (MT) call. Transmission of the system information request may be initiated by a tracking area update or an attach request.

When the first uplink message has a size which is not sufficient to include the additional system information request, the additional system information request may be transmitted to the RAN via the second uplink message.

The system information request may further include information indicating that the additional system information request is to be transmitted.

The system information received by the system information request may be system information set higher in priority than the additional system information received by the additional system information request.

The first uplink message may be a radio resource control (RRC) connection request message, the first downlink message may be an RRC connection setup message, and the second uplink message may be an RRC connection setup complete message.

The first uplink message may be an RRC connection resume request message, the first downlink message may be an RRC connection resume message, and the second uplink message may be an RRC connection resume complete message.

The first uplink message may be an RRC connection re-establishment request message, the first downlink message may be an RRC connection re-establishment message, and the second uplink message may be an RRC Connection re-establishment complete message.

Another embodiment provides a UE requesting additional system information in a wireless communication system. The UE may include: a memory; a transceiver; and a processor configured to connect the memory and the transceiver, wherein the processor may be configured to control the transceiver to: transmit a first uplink message comprising a system information request to a radio access network (RAN); receive a first downlink message comprising requested system information from the RAN in response to the system information request; transmit a second uplink message comprising an additional system information request to the RAN; and receive requested additional system information from the RAN in response to the additional system information request.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
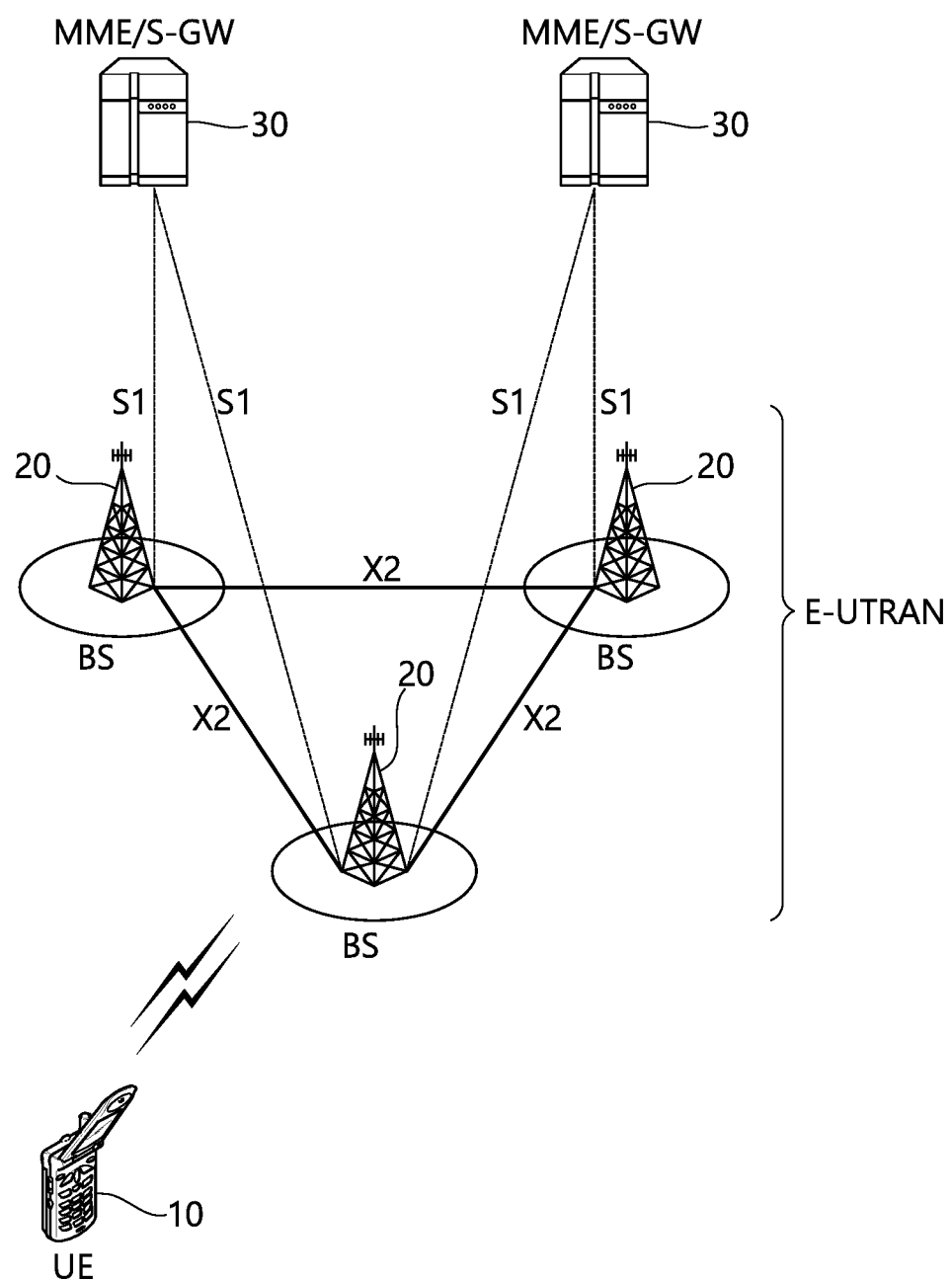
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
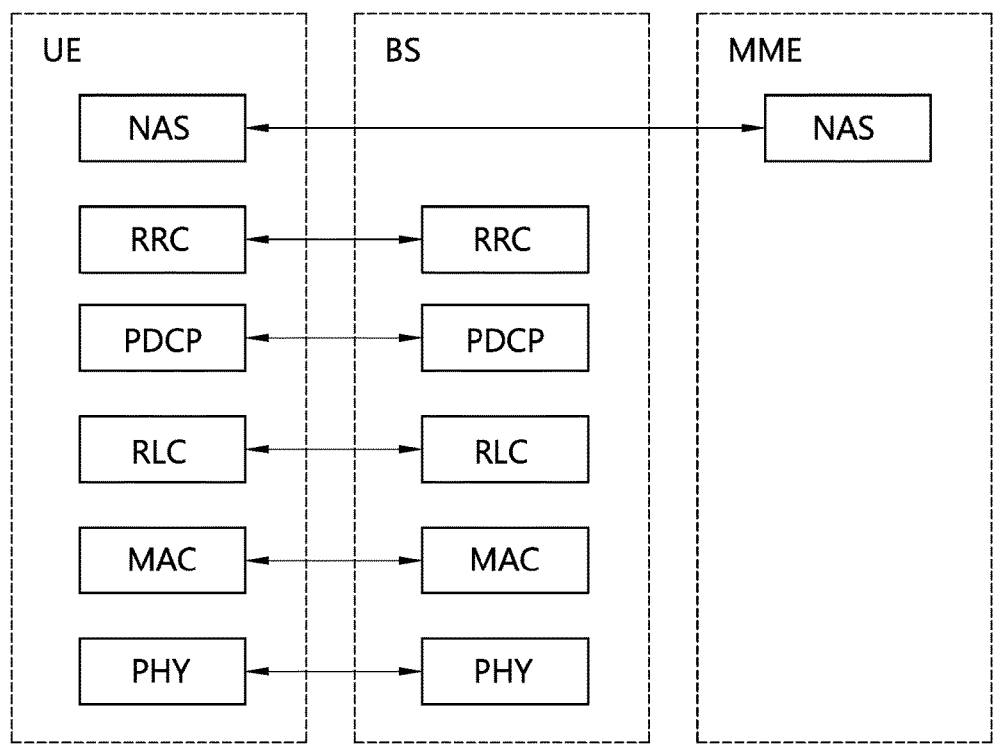
FIG. 2 shows a control plane of a radio interface protocol of an LTE system.
Figure 3:
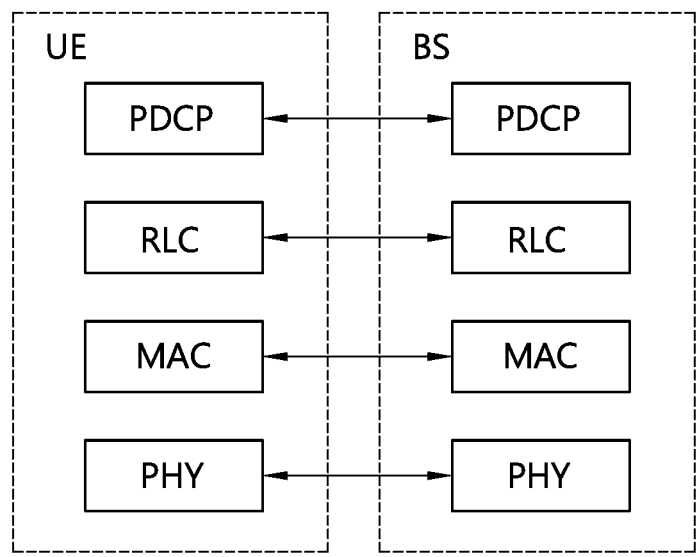
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
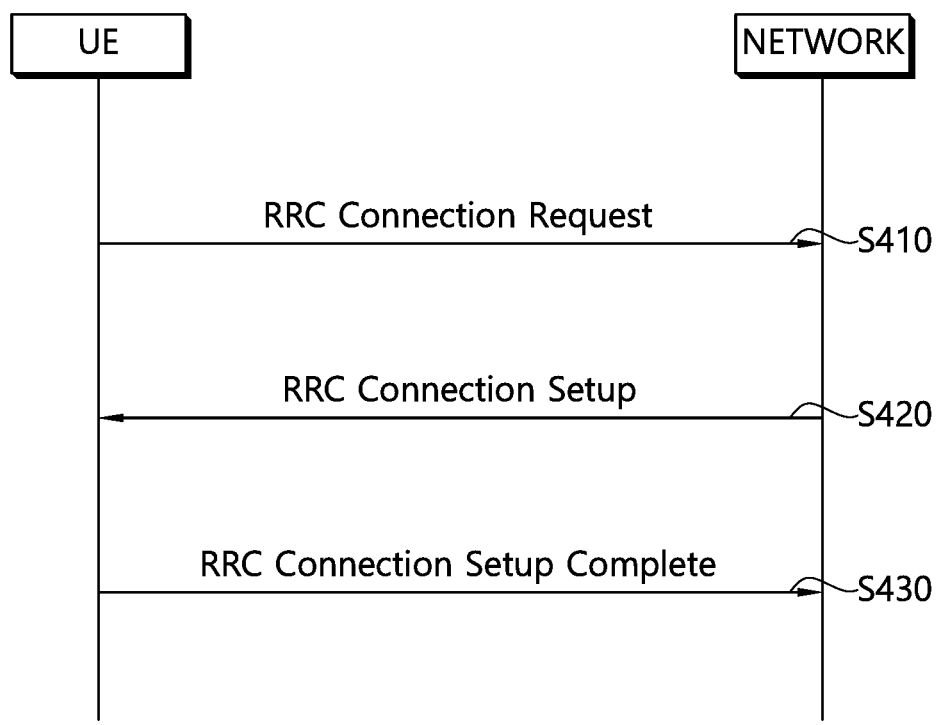
FIG. 4 shows an RRC connection establishment procedure.

FIG. 4 shows an RRC connection establishment procedure.

UE sends an RRC connection request message that requests RRC connection to a network (S410). The network sends an RRC connection establishment message as a response to the RRC connection request (S420). After receiving the RRC connection establishment message, the UE enters RRC connected mode.

The UE sends an RRC connection establishment complete message used to check the successful completion of the RRC connection to the network (S430).

Figure 5:
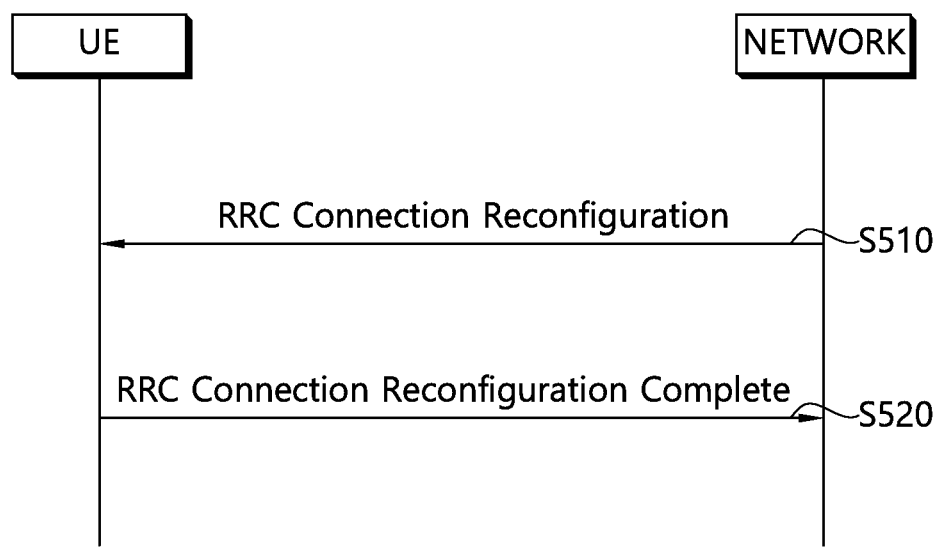
FIG. 5 shows an RRC connection reconfiguration procedure.

FIG. 5 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S510). As a response to the RRC connection reconfiguration message, the UE sends an RRC connection reconfiguration complete message used to check the successful completion of the RRC connection reconfiguration to the network (S520).

Figure 6:
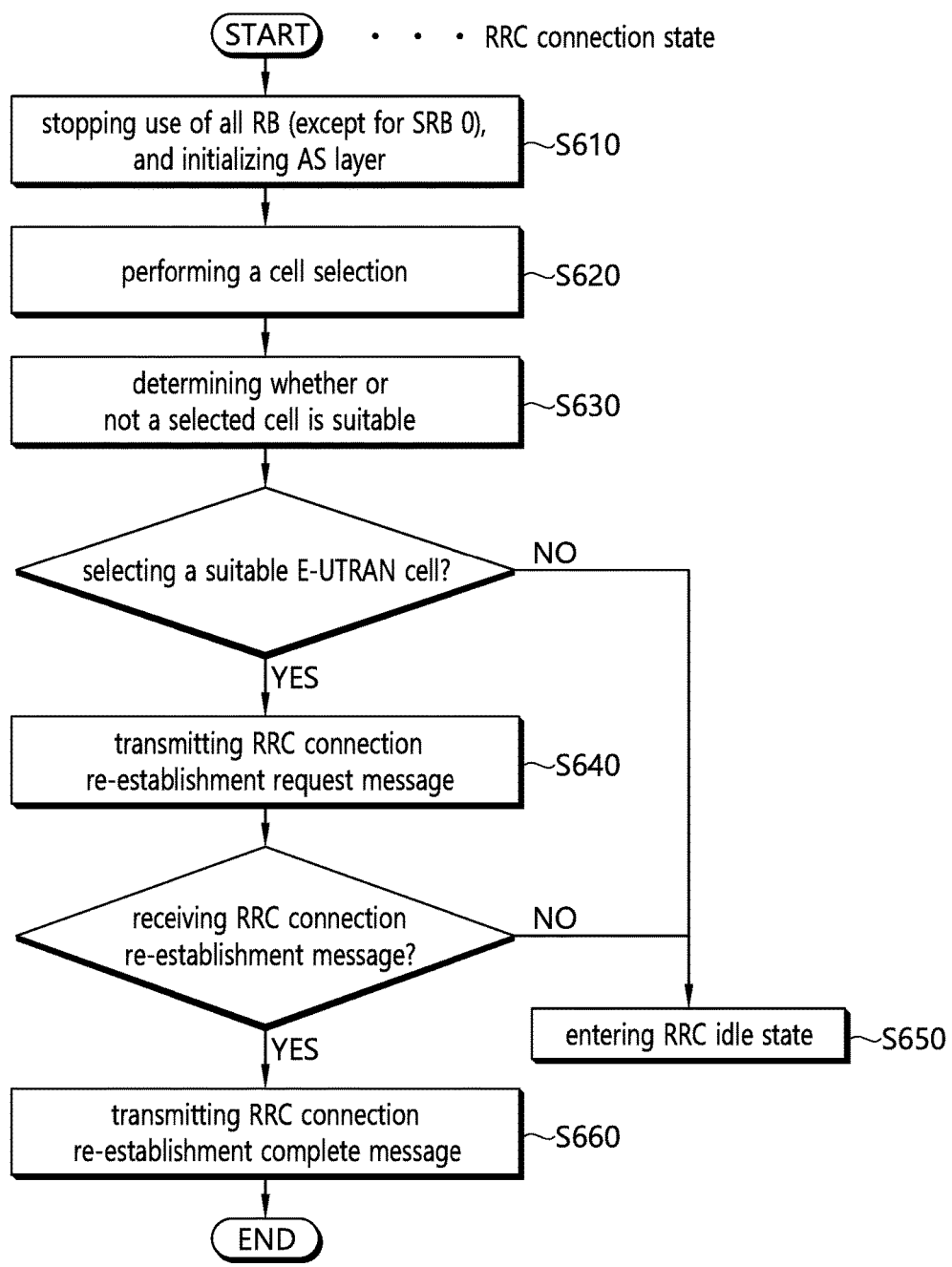
FIG. 6 shows an RRC connection re-establishment procedure.

FIG. 6 shows an RRC connection re-establishment procedure.

Referring to FIG. 6, UE stops using all the radio bearers that have been configured other than a Signaling Radio Bearer (SRB) #0, and initializes a variety of kinds of sublayers of an Access Stratum (AS) (S610). Furthermore, the UE configures each sublayer and the PHY layer as a default configuration. In this process, the UE maintains the RRC connection state.

The UE performs a cell selection procedure for performing an RRC connection reconfiguration procedure (S620). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S630). If the selected cell is determined to be a suitable E-UTRAN cell, the UE sends an RRC connection re-establishment request message to the corresponding cell (S640).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S650).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S660).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, system information is described.

Figure 7:
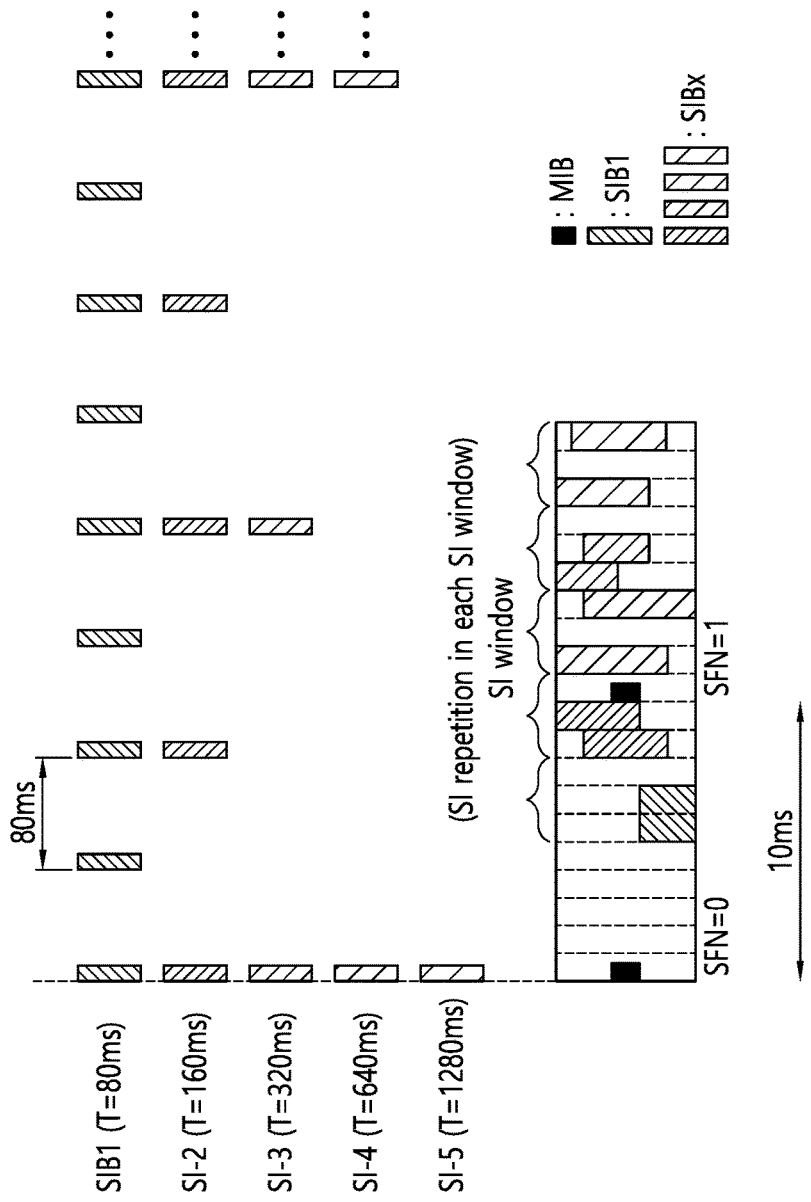
FIG. 7 illustrates an example of transmitting a master information block (MIB), system information block1 (SIB1), and other SIBs.

FIG. 7 illustrates an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 3, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information.

In order that a BS and a UE mutually recognize a radio frame period for transmitting new system information, the concept of BCCH modification period is introduced in "3GPP TS 36.331 v9.3.0," which is described in detail.

Figure 8:
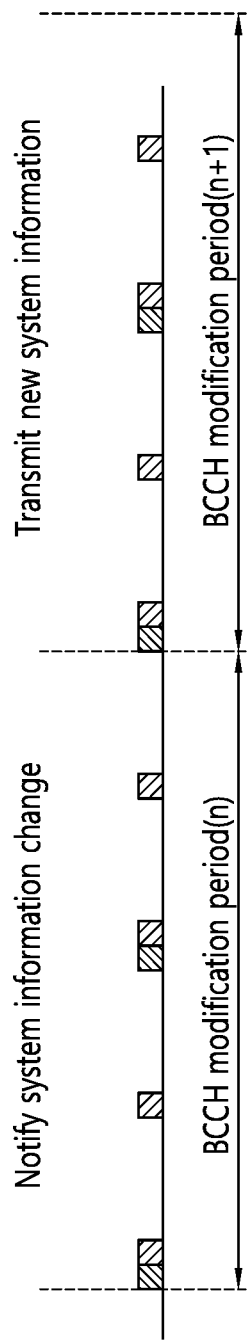
FIG. 8 illustrates an update of system information.

FIG. 8 illustrates an update of system information.

Referring to FIG. 8, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, 5th-generation radio access network (5G RAN) deployment scenarios are described.

5G RAN deployment scenarios may be divided into a non-centralized deployment, a co-sited deployment with E-UTRA, and a centralized deployment according to forms of deploying BS functions in a central unit and a distributed unit or coexistence with a 4G BS. In the present specification, a 5G RAN, a gNB, a next-generation NodeB, a new RAN, and a new radio base station (NR BS) may refer to a BS newly defined for 5G. Further, basic functions supported by the 5G RAN may be defined in Table 1.

same spot. The co-sited deployment may be suitable for an urban macro-environment. In the co-sited deployment, it is possible to utilize all frequency resources assigned to 4G/5G by adjusting a BS configuration using load balancing and multi-connectivity and to extend cell coverage for cell-boundary users by using lower frequencies.

Figure 11:
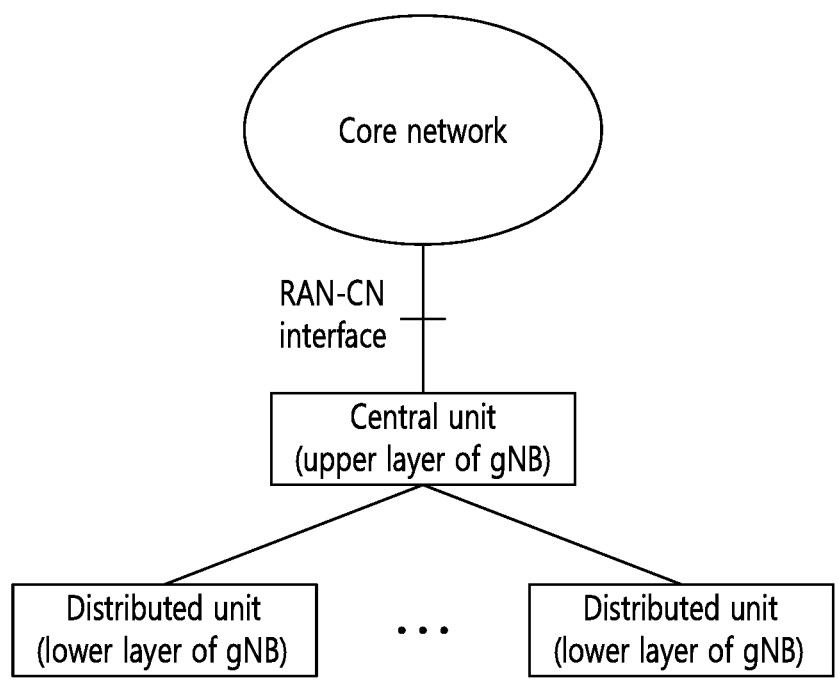
FIG. 11 illustrates a centralized deployment

FIG. 11 illustrates a centralized deployment

Referring to FIG. 11, gNBs may be separated into a central unit and a distributed unit. That is, the gNBs may be hierarchically separated to operate. The central unit may perform the functions of upper layers of a BS, and the distributed unit may perform the functions of lower layers of a BS. The centralized deployment may be classified as a high-performance transport type or a low-performance transport type according to the transmission capacity and delay characteristics of a transport device connecting the central unit and the distributed unit.

In transport requiring high performance, the central unit accommodates a large number of functions of from an upper layer to a lower layer, whereas the distributed unit accommodates only a relatively small number of functions of some lower layer. Thus, the central unit may have a heavy processing load, and it may be difficult to meet the transmission capacity or delay and synchronization requirements of the transport device. For example, when most layers (RRC layer to physical layer) are deployed in the central unit and only an RF function is deployed in the distributed unit, it is estimated that the transmission band of the transport device is about 157 Gbps and the maximum delay thereof is about 250 us, and thus the transport device requires an

TABLE 1

| | Functional group similar to E-UTRAN |
|---|---|
| Functions similar to E-UTRAN | Synchronization, paging, connection, handover, load balancing, radio access network sharing, etc. |
| | First new RAN functional group |
| To support network slicing | Possible to support core network slicing of RAN |
| Tight interworking | Dual connectivity and data flow aggregation between 4G and 5G BSs |
| Multi-connectivity | To simultaneously connect one new RAN node and multiple new RAN nodes through data flow aggregation |
| To support multi-RAT handover | To support handover through new direct interface (xX) between eLTE eNB and gNB |
| | Second new RAN functional group |
| UE inactive mode | To enable immediate connection in occurrence of new traffic to UE when disconnected from radio access resource and connected to wired access (gNB-NGC) |
| Direct service | D2D improvement |
| Non-3GPP interworking | Interworking between non-3GPP (e.g., WLAN) and NR |
| To support inter-RAT handover through core | To support handover between E-UTRA and NR through core network |

Figure 9:
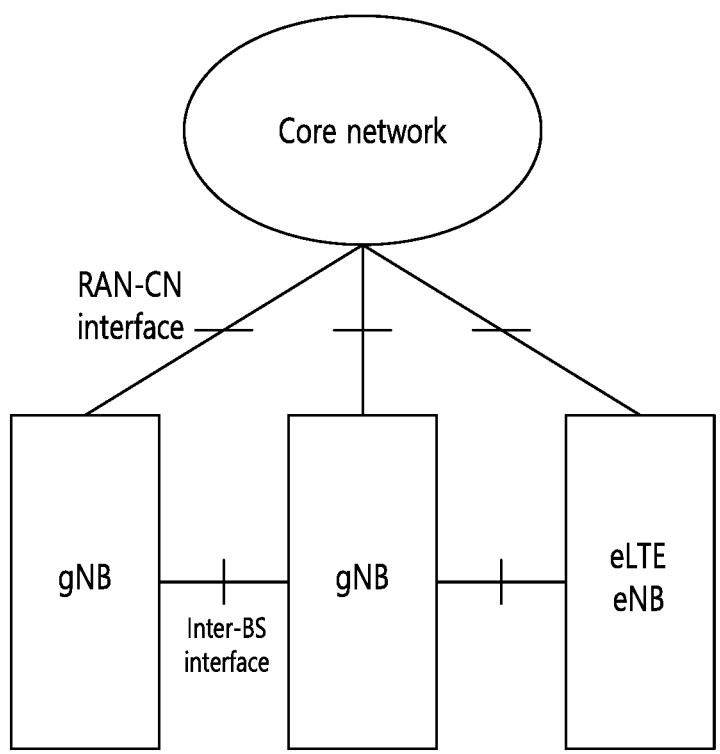
FIG. 9 illustrates a non-centralized deployment.

FIG. 9 illustrates a non-centralized deployment.

Referring to FIG. 9, gNBs may be horizontally configured, instead of being hierarchically separated into a central unit and a distributed unit. In this case, a full protocol stack may be supported at each gNB. The non-centralized deployment is suitable for a macrocell or indoor hotspot environment. A gNB may be connected directly to another gNB or eLTE eNB through an inter-BS interface. A gNB may be connected directly to a core network through an RAN-CN interface.

Figure 10:
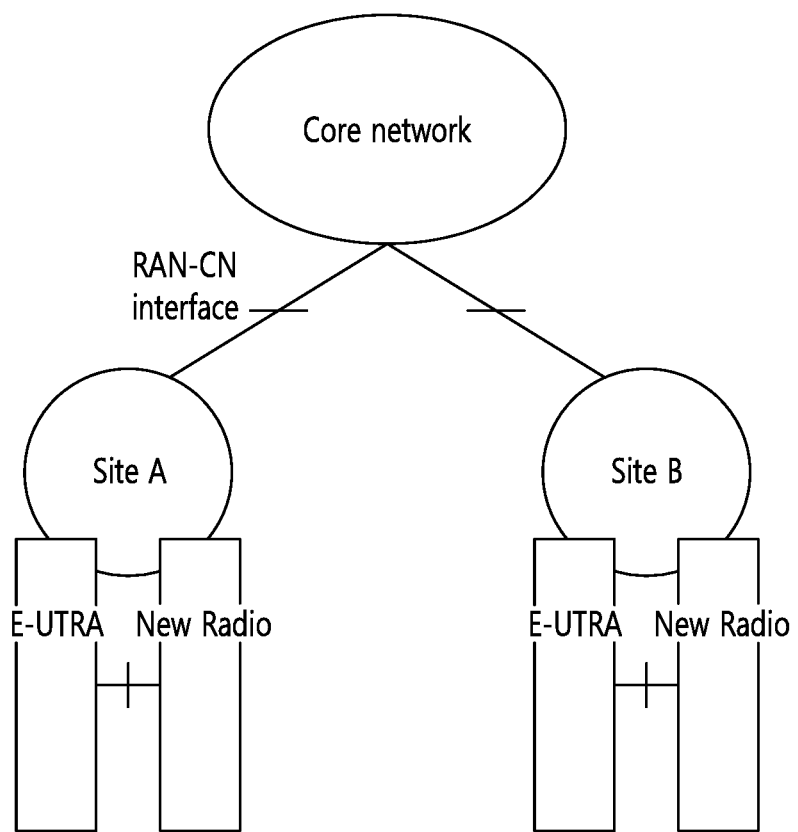
FIG. 10 illustrates a co-sited deployment with E-UTRA.

FIG. 10 illustrates a co-sited deployment with E-UTRA.

Referring to FIG. 10, a 5G transmission mode (For example, new radio) and a 4G transmission mode (for example, E-UTRA) may be simultaneously used in one optical network providing a high capacity and a low delay. However, since the transmission delay is short, coordinated communication (for example, CoMP) between BSs may be easily achieved by using an optimal scheduling technique.

In transport requiring low performance, since the central unit accommodates upper-layer protocol functions having a relatively low processing load, the transport device has a transmission capacity margin and a delay margin. For example, when only an upper layer (RRC layer) or above is deployed in the central unit and all of the other lower layers (PDCP layer to RF) are deployed in the distributed unit, it is estimated that the transmission band of the transport device is about 3 to 4 Gbps and the maximum delay thereof is about 10 ms, and thus the transport device has a transmission capacity margin and a delay margin as compared with in transport requiring high performance.

Meanwhile, the number of system information blocks (SIB s) is steadily increasing. As the use of radio resources is needed to broadcast SIBs, an increase in the number of SIBs inevitably leads to an increase in the quantity of radio resources needed to broadcast SIBs. To solve this problem, a new type of system information is proposed. The new type of system information is not always broadcast by a network but may be transmitted from the network only when a UE requests system information. This type of system information may be referred to as on-demand system information (OSI) or minimum system information (MSI).

Regarding on-demand system information, a UE may request system information in a cell, and a network receiving this request may transmit the requested system information to the UE. However, when the UE requests a certain amount or greater of system information, the size of an uplink message is not sufficient to accommodate the system information request. Thus, when the UE requests system information, it is necessary to propose a new procedure for efficiently requesting system information. Hereinafter, a method for a UE to request additional system information and an apparatus supporting the same according to an embodiment of the present invention are described in detail.

In the present specification, an RAN may not broadcast all system information in a cell. Alternatively, the RAN may broadcast some system information in the cell. The RAN may broadcast only one or more MIBs and system information block type 1 to system information block type N−1. Meanwhile, the RAN may not broadcast system information block type N to system information block type M. N and M are system information type numbers, N is a system information type number smaller than or equal to M, and M is the highest system information type number among system information blocks supported by the cell.

In the present specification, a system information request may be transmitted via at least one of the following control signaling:
  Physical-layer resources including PUCCH resources or PRACH preamble resources, for example, random access preamble ID (RAPID) or time/frequency PRACH resources;
  Second-layer control signaling such as an MAC control element, RLC control PDU, or PDCP control PDU;
  RRC message; or
  NAS message.

In the present specification, a system information request may include at least one of the following elements.
  Value tag indicating system information currently stored in a UE
  Number of requested system information block type
  Set of request system information blocks
  UE identity
  Some or all of UE capability information
  Support of particular feature, for example, support of eMBMS or support of sidelink In the present specification, an RAN may be an LTE BS (that is, an eNB). Alternatively, the RAN may be a new RAT BS that may include a central unit and/or one or more distributed units. The RAN may manage a cell.

Figure 12:
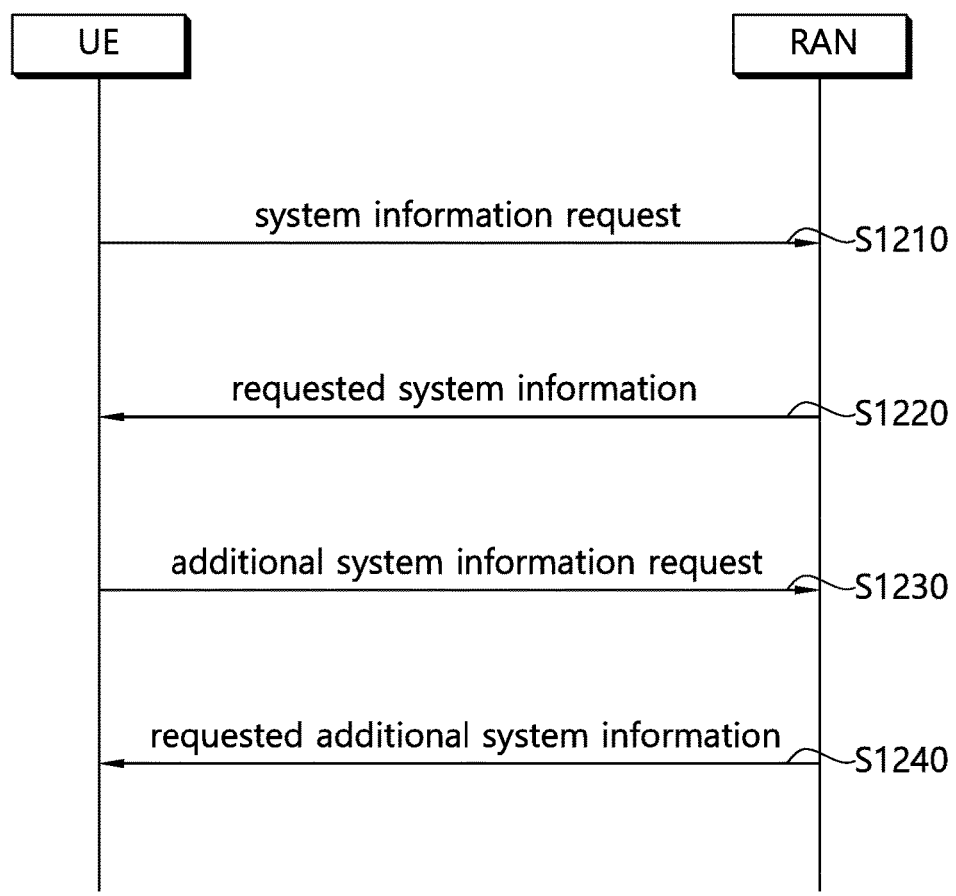
FIG. 12 illustrates a procedure in which a UE requests additional system information according to an embodiment of the present invention.

FIG. 12 illustrates a procedure in which a UE requests additional system information according to an embodiment of the present invention.

Referring to FIG. 12, in operation S1210, the UE may transmit a system information request to an RAN. The system information request may be an indicator for requesting system information from the RAN. Additionally, the system information request may further include information indicating that a further system information request is to be transmitted to the RAN subsequently.

The system information request may be transmitted to the RAN through an RRC connection establishment procedure, an RRC connection resume procedure, or an RRC connection re-establishment procedure. For example, an NAS layer of the UE may initiate an RRC connection establishment procedure or an RRC connection resume procedure by an attach request, a tracking area update or a service request for a mobile originating (MO) signaling, MO call or mobile terminating (MT) call. For example, the UE may initiate an RRC connection re-establishment procedure by a radio link failure (RLF) or a handover failure (HOF).

In operation S1220, the UE may receive the requested system information from the RAN.

In operation S1230, the UE may transmit an additional system information request to the RAN. The additional system information request may be an indicator for requesting additional system information from the RAN. For example, when the size of an uplink message including the system information request is not sufficient to include the additional system information request, the additional system information request may be transmitted in operation S1230, separately from the system information request.

In operation S1240, the UE may receive the requested additional system information from the RAN. The additional system information received by the additional system information request in operation S1240 may be system information having a lower priority than the system information received by the system information request in operation S1220.

For example, the UE may request essential system information in operation S1210 and may preferentially receive the system information in operation S1220. Subsequently, the UE may request system information having less importance than the essential system information in operation S1230 and may receive the system information having less importance in operation S1240.

For example, the UE may request system information having a higher priority than a specified priority in operation S1210 and may preferentially receive the system information having the higher priority. Subsequently, the UE may request remaining system information in operation S1230 and may receive the remaining system information in operation S1240. The priority of the system information may be set by the network or the UE.

According to the embodiment of the present invention, after requesting system information from the RAN, the UE may request additional system information from the RAN. For example, when the size of a first uplink message is insufficient, the UE may request only essential system information first, and may then request additionally needed system information. Therefore, it is possible to efficiently utilize radio resources for requesting system information.

Figure 13:
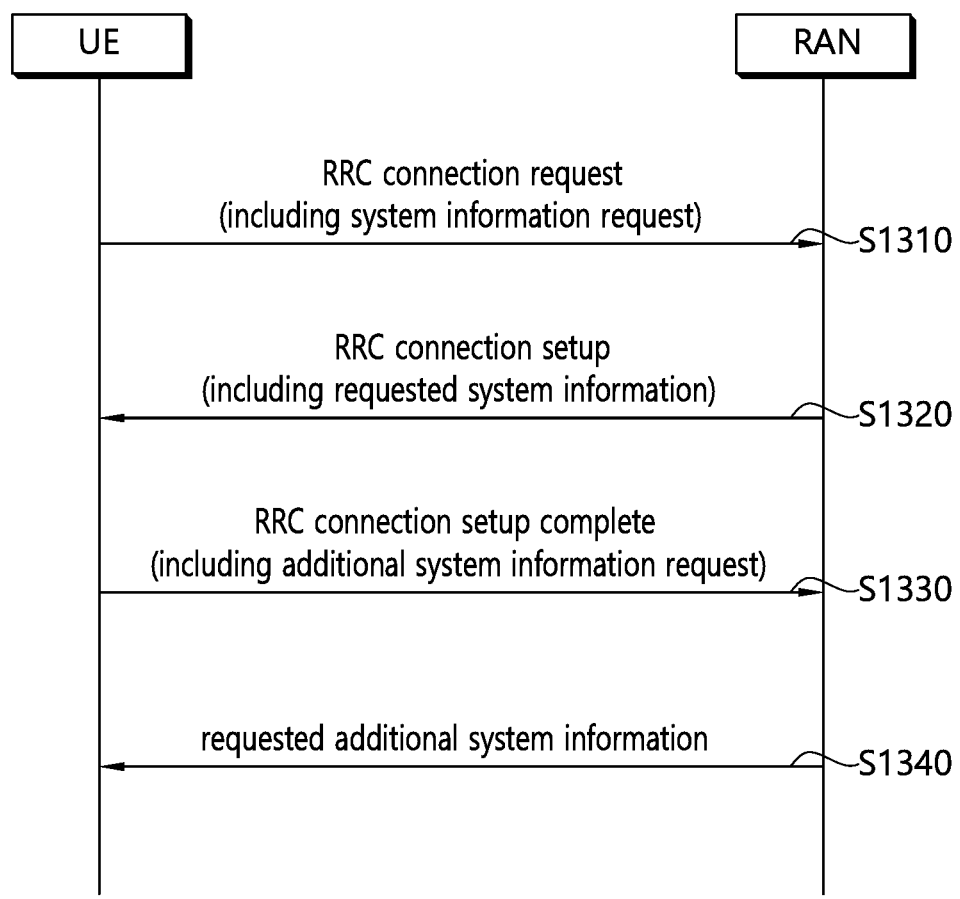
FIG. 13 illustrates a procedure in which a UE requests additional system information through an RRC connection establishment procedure according to an embodiment of the present invention.

FIG. 13 illustrates a procedure in which a UE requests additional system information through an RRC connection establishment procedure according to an embodiment of the present invention.

An RRC connection establishment procedure may be initiated by a UE upon an attach request, a tracking area update or a service request for an MO signaling, MO call or MT call.

Referring to FIG. 13, in operation S1310, the UE may transmit an RRC connection request message including a system information request to an RAN. The system information request may be an indicator for requesting system information from the RAN. In addition, the RRC connection request message may further include information indicating that an additional system information request is subsequently to be transmitted to the RAN. Alternatively, the system information request may indicate that an additional system information request is subsequently to be transmitted to the RAN.

In operation S1320, the UE may receive an RRC connection setup message including the requested system information from the RAN.

In operation S1330, the UE may transmit an RRC connection setup complete message including an additional system information request to the RAN. The additional system information request may be an indicator for requesting additional system information from the RAN. For example, when the size of the RRC connection request message including the system information request is not sufficient to include the additional system information request, the additional system information request may be transmitted to the RAN via the RRC connection setup complete message, separately from the system information request.

In operation S1340, the UE may receive the requested additional system information from the RAN. The additional system information received by the additional system information request in operation S1340 may be system information having a lower priority than the system information received by the system information request in operation S1320. The priority of the system information may be set by the network or the UE.

According to the proposed procedure, a UE desiring to receive system information may receive system information and additional system information through an RRC connection establishment procedure.

Figure 14:
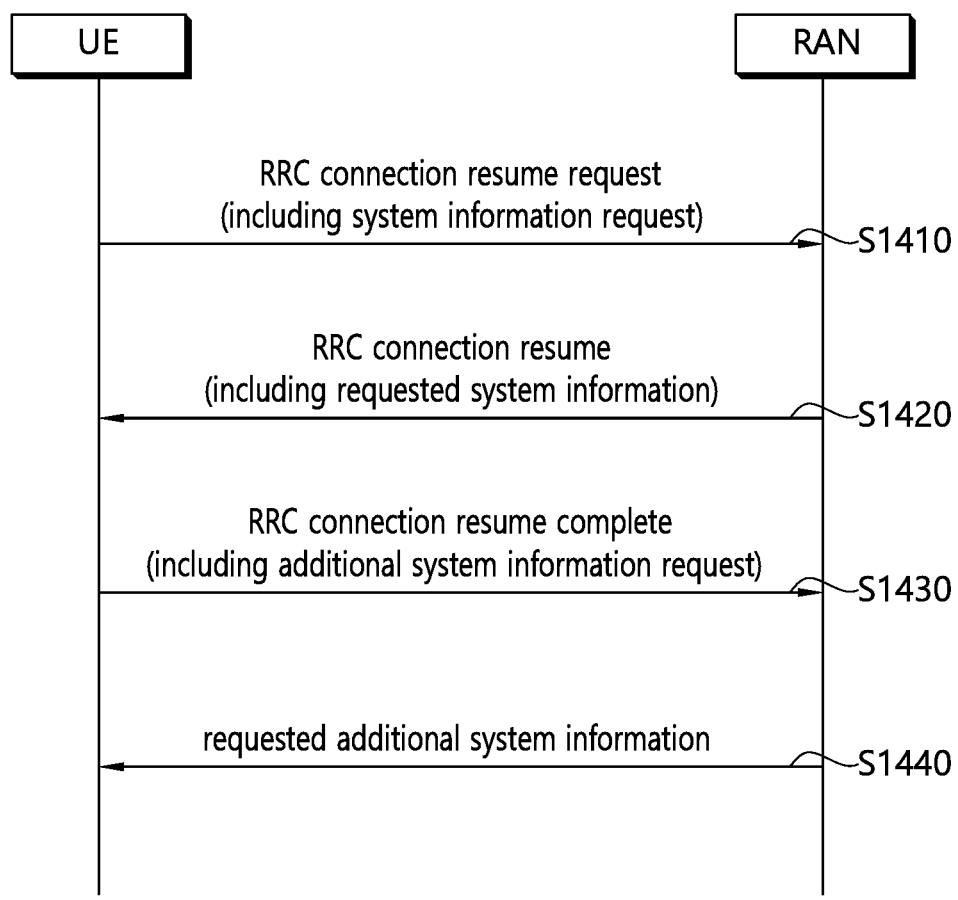
FIG. 14 illustrates a procedure in which a UE requests additional system information through an RRC connection resume procedure according to an embodiment of the present invention.

FIG. 14 illustrates a procedure in which a UE requests additional system information through an RRC connection resume procedure according to an embodiment of the present invention.

An RRC connection resume procedure may be initiated by a UE upon an attach request, a tracking area update or a service request for an MO signaling, MO call or MT call.

Referring to FIG. 14, in operation S1410, the UE may transmit an RRC connection resume request message including a system information request to the RAN. The system information request may be an indicator for requesting system information from the RAN. In addition, the RRC connection resume request message may further include information indicating that an additional system information request is subsequently to be transmitted to the RAN. Alternatively, the system information request may indicate that an additional system information request is subsequently to be transmitted to the RAN.

In operation S1420, the UE may receive an RRC connection resume message including the requested system information from the RAN.

In operation S1430, the UE may transmit an RRC connection resume complete message including an additional system information request to the RAN. The additional system information request may be an indicator for requesting additional system information from the RAN. For example, when the size of the RRC connection resume request message including the system information request is not sufficient to include the additional system information request, the additional system information request may be transmitted to the RAN via the RRC connection resume complete message, separately from the system information request.

In operation S1440, the UE may receive the requested additional system information from the RAN. The additional system information received by the additional system information request in operation S1440 may be system information having a lower priority than the system information received by the system information request in operation S1420. The priority of the system information may be set by the network or the UE.

According to the proposed procedure, a UE desiring to receive system information may receive system information and additional system information through an RRC connection resume procedure.

Figure 15:
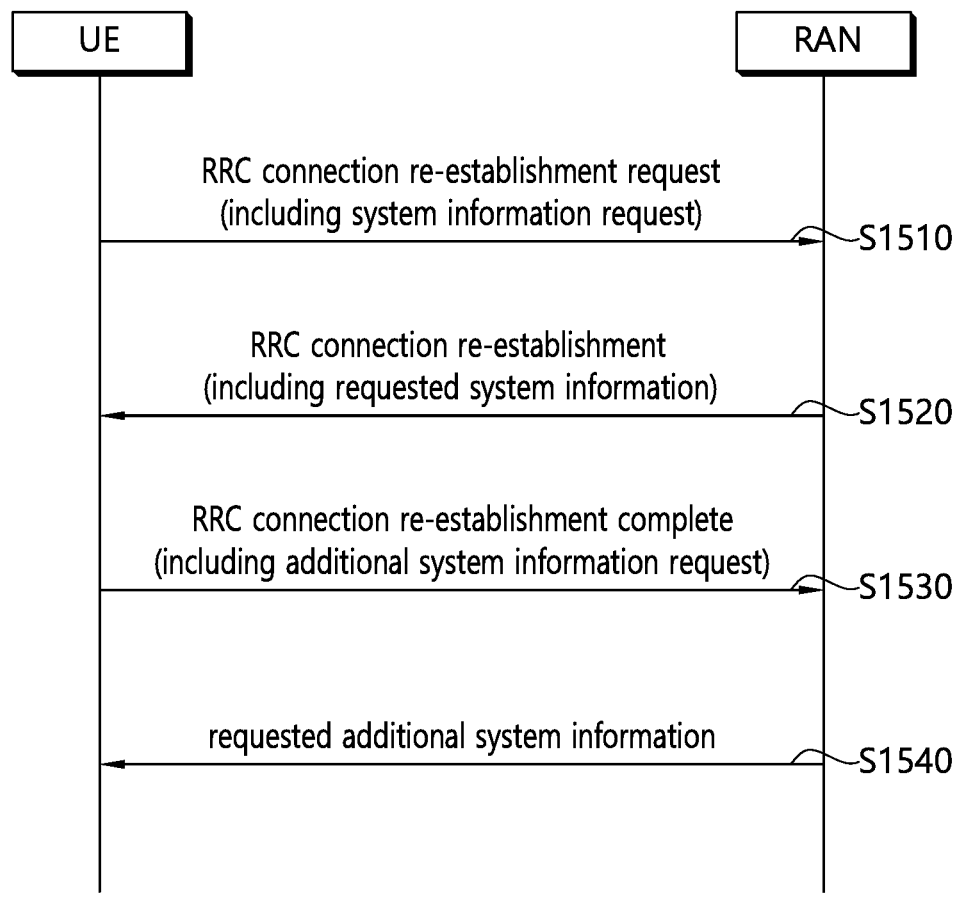
FIG. 15 illustrates a procedure in which a UE requests additional system information through an RRC connection re-establishment procedure according to an embodiment of the present invention.

FIG. 15 illustrates a procedure in which a UE requests additional system information through an RRC connection re-establishment procedure according to an embodiment of the present invention.

An RRC connection re-establishment procedure may be initiated by a UE due to a radio link failure or a handover/mobility failure.

Referring to FIG. 15, in operation S1510, the UE may transmit an RRC connection re-establishment request message including a system information request to the RAN. The system information request may be an indicator for requesting system information from the RAN. In addition, the RRC connection re-establishment request message may further include information indicating that an additional system information request is subsequently to be transmitted to the RAN. Alternatively, the system information request may indicate that an additional system information request is subsequently to be transmitted to the RAN.

In operation S1520, the UE may receive an RRC connection re-establishment message including the requested system information from the RAN.

In operation S1530, the UE may transmit an RRC connection re-establishment complete message including an additional system information request to the RAN. The additional system information request may be an indicator for requesting additional system information from the RAN. For example, when the size of the RRC connection re-establishment request message including the system information request is not sufficient to include the additional system information request, the additional system information request may be transmitted to the RAN via the RRC connection re-establishment complete message, separately from the system information request.

In operation S1540, the UE may receive the requested additional system information from the RAN. The additional system information received by the additional system information request in operation S1540 may be system information having a lower priority than the system information received by the system information request in operation S1520. The priority of the system information may be set by the network or the UE.

According to the proposed procedure, a UE desiring to receive system information may receive system information and additional system information through an RRC connection re-establishment procedure.

Figure 16:
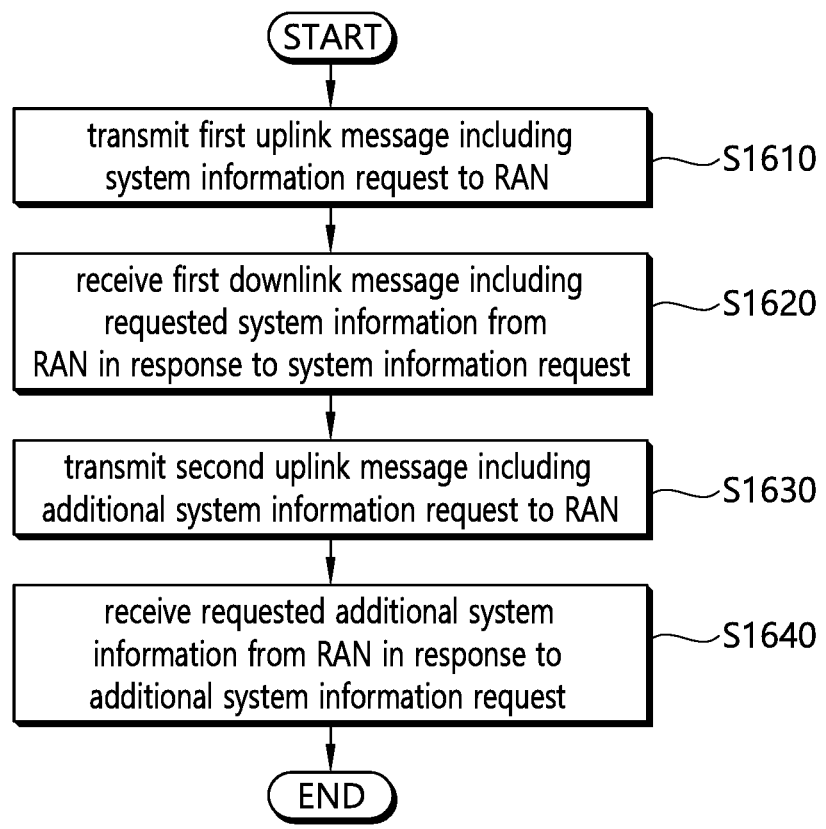
FIG. 16 is a block diagram illustrating a method for a UE to request additional system information according to an embodiment of the present invention.

FIG. 16 is a block diagram illustrating a method for a UE to request additional system information according to an embodiment of the present invention.

Referring to FIG. 16, in operation S1610, the UE may transmit a first uplink message including a system information request to an RAN. In addition, the system information request may further include information indicating that an additional system information request is to be transmitted.

The transmission of the system information request may be initiated by a radio link failure. The transmission of the system information request may be initiated by a handover failure. The transmission of the system information request may be initiated by a service request for an MO signaling, MO call or MT call. The transmission of the system information request may be initiated by a tracking area update or an attach request.

In operation S1620, the UE may receive a first downlink message including requested system information from the RAN in response to the system information request.

In operation S1630, the UE may transmit a second uplink message including an additional system information request to the RAN. When the size of the first uplink message is not sufficient to include the additional system information request, the additional system information request may be included in the second uplink message and transmitted to the RAN.

In operation S1640, the UE may receive requested additional system information from the RAN in response to the additional system information request. The system information received by the system information request may be system information set higher in priority than the additional system information received by the additional system information request.

The first uplink message may be an RRC connection request message, the first downlink message may be an RRC connection setup message, and the second uplink message may be an RRC connection setup complete message.

Alternatively, the first uplink message may be an RRC connection resume request message, the first downlink message may be an RRC connection resume message, and the second uplink message may be an RRC connection resume complete message.

Alternatively, the first uplink message may be an RRC connection re-establishment request message, the first downlink message may be an RRC connection re-establishment message, and the second uplink message may be an RRC Connection re-establishment complete message.

Figure 17:
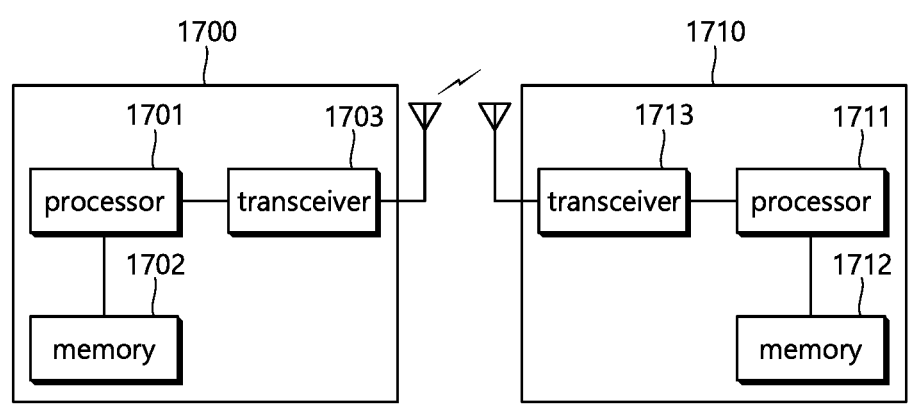
FIG. 17 is a block diagram illustrating a wireless communication system according to the embodiment of the present invention.

FIG. 17 is a block diagram illustrating a wireless communication system according to the embodiment of the present invention.

A BS 1700 includes a processor 1701, a memory 1702 and a transceiver 1703. The memory 1702 is connected to the processor 1701, and stores various information for driving the processor 1701. The transceiver 1703 is connected to the processor 1701, and transmits and/or receives radio signals. The processor 1701 implements proposed functions, processes and/or methods. In the above embodiment, an operation of the base station may be implemented by the processor 1701.

A UE 1710 includes a processor 1711, a memory 1712 and a transceiver 1713. The memory 1712 is connected to the processor 1711, and stores various information for driving the processor 1711. The transceiver 1713 is connected to the processor 1711, and transmits and/or receives radio signals. The processor 1711 implements proposed functions, processes and/or methods. In the above embodiment, an operation of the base station may be implemented by the processor 1711.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for a user equipment (UE) to receive additional system information in a wireless communication system, the method comprising:
   determining to acquire system information and the additional system information,
   wherein the system information has a higher priority over the additional system information;
   transmitting, to a radio access network (RAN), a radio resource control (RRC) request message, including first information requesting the system information,
   wherein the RRC request message has a size which is not sufficient to include second information requesting the additional system information;
   receiving an RRC setup message including the requested system information, from the RAN, in response to the RRC request message including the first information requesting the system information;
   transmitting an RRC setup complete message including the second information requesting the additional system information, to the RAN; and
   receiving the requested additional system information, from the RAN, in response to the RRC setup complete message including the second information requesting the additional system information.

2. The method of claim 1, wherein transmitting the RRC request message is initiated by a service request for a mobile originating (MO) signaling, MO call or mobile terminating (MT) call.

3. The method of claim 1, wherein transmitting the RRC request message is initiated by a tracking area update or an attach request.

4. The method of claim 1, wherein the first information requesting the system information further includes third information, indicating the second information requesting the additional system information be transmitted.

5. A user equipment (UE) receiving additional system information in a wireless communication system, the UE comprising:
- a memory;
- a transceiver; and
- a processor, operably connected to the memory and the transceiver, wherein the processor is configured to:
- determine to acquire system information and the additional system information,
- wherein the system information has a higher priority over the additional system information;
- control the transceiver to transmit, to a radio access network (RAN), a radio resource control (RRC) request message, including first information requesting the system information,
- wherein the RRC request message has a size which is not sufficient to include second information requesting the additional system information;
- control the transceiver to receive an RRC setup message including the requested system information, from the RAN, in response to the RRC request message including the first information requesting the system information;
- control the transceiver to transmit an RRC setup complete message including the second information requesting the additional system information, to the RAN; and
- control the transceiver to receive the requested additional system information, from the RAN, in response to the RRC setup complete message including the second information requesting the additional system information.

6. A method for a user equipment (UE) to receive additional system information in a wireless communication system, the method comprising:
- determining to acquire system information and the additional system information,
- wherein the system information has a higher priority over the additional system information;
- transmitting, to a radio access network (RAN), a radio resource control (RRC) resume request message, including first information requesting the system information,
- wherein the RRC request message has a size which is not sufficient to include second information requesting the additional system information;
- receiving an RRC resume message including the requested system information, from the RAN, in response to the RRC resume request message including the first information requesting the system information;
- transmitting an RRC resume complete message including the second information requesting the additional system information, to the RAN; and
- receiving the requested additional system information, from the RAN, in response to the RRC resume complete message including the second information requesting the additional system information.

7. The method of claim 6, wherein transmitting the RRC resume request message is initiated by a service request for a mobile originating (MO) signaling, MO call or mobile terminating (MT) call.

8. The method of claim 6, wherein transmitting the RRC resume request message is initiated by a tracking area update or an attach request.

* * * * *